(12) United States Patent
Angelis

(10) Patent No.: US 10,371,548 B2
(45) Date of Patent: Aug. 6, 2019

(54) ABSOLUTE ANGLE DETERMINATION

(71) Applicant: Georgo Angelis, Oss (NL)

(72) Inventor: Georgo Angelis, Oss (NL)

(73) Assignee: Aktiebolaget SKF, Göteborg (SE)

(*) Notice: Subject to any disclaimer, the term of this patent is extended or adjusted under 35 U.S.C. 154(b) by 348 days.

(21) Appl. No.: 15/230,681

(22) Filed: Aug. 8, 2016

(65) Prior Publication Data

US 2017/0045375 A1   Feb. 16, 2017

(30) Foreign Application Priority Data

Aug. 6, 2015 (GB) .................................. 1513881.1

(51) Int. Cl.
| | |
|---|---|
| *G01D 5/04* | (2006.01) |
| *G01D 5/26* | (2006.01) |
| *G01D 5/245* | (2006.01) |
| *G01D 5/14* | (2006.01) |

(52) U.S. Cl.
CPC ............ *G01D 5/04* (2013.01); *G01D 5/2454* (2013.01); *G01D 5/14* (2013.01); *G01D 5/26* (2013.01); *G01D 5/262* (2013.01)

(58) Field of Classification Search
CPC .. G01D 5/04; G01D 5/14; G01D 5/26; G01D 5/2454; G01D 5/262
See application file for complete search history.

(56) References Cited

U.S. PATENT DOCUMENTS

| | | | | |
|---|---|---|---|---|
| 7,447,579 | B2* | 11/2008 | Lee ..................... | B62D 15/0215 180/6.2 |
| 2009/0315544 | A1* | 12/2009 | Takahashi ............. | F16C 41/007 702/155 |
| 2010/0102803 | A1* | 4/2010 | Kobayashi ........... | G01D 5/2013 324/207.25 |
| 2010/0301845 | A1 | 12/2010 | Acker | |
| 2011/0227562 | A1* | 9/2011 | Sasaki .................. | G01D 5/2452 324/207.25 |

FOREIGN PATENT DOCUMENTS

| | | |
|---|---|---|
| DE | 102006028220 A1 | 12/2007 |
| JP | 2001264049 A | 9/2001 |
| WO | 2014131434 A1 | 9/2014 |

* cited by examiner

*Primary Examiner* — Sujoy K Kundu
*Assistant Examiner* — Lynda Dinh
(74) *Attorney, Agent, or Firm* — Bryan Peckjian; SKF USA Inc. Patent Dept.

(57) ABSTRACT

A device for measuring an absolute angle includes first and second rotatable members having first and second radii and capable of rotating over first and second angles respectively, a first number of detectable elements mounted on the first rotatable member, a second number of detectable elements mounted on the second rotatable member, and at least one sensor for detecting rotation of the detectable elements. The second rotatable member is coupled with the first rotatable member such that the second angle is equal to the first angle times the ratio of the first radius and the second radius. The first radius is equal to a first integer times a factor, while the second radius is equal to a second integer times the factor. The product of the first number and the second integer, and the product of the second number and the first integer, are co-prime.

10 Claims, 3 Drawing Sheets

ABSOLUTE ANGLE DETERMINATION

CROSS REFERENCE TO RELATED APPLICATIONS

This application claims priority to Great Britain (GB) patent application no. 1513881.1 filed on Aug. 6, 2015, the contents of which are fully incorporated herein by reference.

FIELD OF THE INVENTION

The present invention relates to absolute angle determination. More in particular, the present invention relates to a device for measuring an absolute angle, a method for measuring an absolute angle and a software program product for carrying out said method.

BACKGROUND OF THE INVENTION

It is often necessary to determine an angle, such as the angle over which a wheel or axle rotates. Some types of so-called rotary encoders or shaft encoders convert an angular position or rotation of a shaft or axle into an analogue or digital code. Shaft encoders of the mechanical type may have one or more concentric rings with openings which, when such a ring rotates, may be detected by mechanical contacts. In optical shaft encoders, the openings or alternating transparent and opaque areas may be detected using a light source and a photo detector, for example. In some applications, such as bearings, optical encoders may not be practical as grease may obscure the rings. Magnetic shaft encoders typically use a ring provided with a plurality of magnets and Hall sensors capable of detecting the magnets as the ring rotates. An example of such a shaft encoder or rotation detection device is disclosed in United States patent application US 2009/315544.

The rotation detection device of US 2009/315544 has two concentric rings, each provided with magnets, and determines an absolute rotation angle based on the detected phase difference of the rings. However, this known device is incapable of measuring angles greater than 360°, as the same phase difference occurs every 360°. In order to measure greater angles, a memory would have to be provided to store a counter value which is increased after each 360° rotation. The absolute angle which can be measured with this known device is therefore limited to 360°, after which the measured angle becomes a relative angle, that is, relative to the counter value.

International patent application WO 2014/131434 discloses an angle determining device for determining an absolute angle signal of a first part rotated with respect to a second part. The angle sensor comprises a first grating ring for generating a first signal representative of a relative position of a first sensor along a corresponding ring segment of the first grating ring. The angle sensor further comprises a second grating ring for generating a second signal representative of a relative position of a second sensor along the corresponding ring segment of the second grating ring. The first plurality and the second plurality are co-prime numbers and a difference between the first plurality and the second plurality being larger than one. The angle sensor also comprises a calculator configured for calculating the absolute angle signal using a first linear combination of the first signal and the second signal.

The angle determining device of WO 2014/131434 decreases the ambiguity of the phase difference between two rings, but does not resolve this ambiguity beyond 360°.

In summary, there is a need for an absolute angle sensor which does not rely on a memory, but still is capable of providing absolute angle measurements of angles greater than 360°.

SUMMARY OF THE INVENTION

It is an object of the present invention to solve this problem by providing a device for measuring an absolute angle which provides an unambiguous and therefore absolute angle also for rotations larger than 360°. It is a further object of the present invention to provide a device for measuring an absolute angle which is suitable for use in or with bearings.

Accordingly, the present invention provides a device for measuring an absolute angle, the device comprising:
- a first rotatable member having a first radius,
- a second rotatable member having a second radius,
- a first number of detectable elements provided on the first rotatable member,
- a second number of detectable elements provided on the second rotatable member,
- at least one sensor for detecting rotation of the detectable elements,
- wherein the first radius is equal to a first integer times a factor,
- wherein the second radius is equal to a second integer times said factor,
- wherein the second rotatable member is coupled with the first rotatable member such that a rotation of the first rotatable member over a first angle causes the second rotatable member to rotate over a second angle equal to the first angle times the ratio of the first radius and the second radius, and
- wherein the product of the first number and the second integer, and the product of the second number and the first integer, are co-prime.

By providing an absolute angle measuring device in which two specific products of parameters are co-prime, an absolute angle greater than 360° can be determined, as will later be explained in detail.

The first product is the product of the first number and the second integer, where the first number is the number of detectable elements mounted on the first rotatable member, while the second integer is equal to the radius of the second rotatable member, divided by the factor common to both the first and the second radius. The second product is the product of the second number and the first integer, where the second number is the number of detectable elements mounted on the second rotatable member, while the first integer is equal to the radius of the first rotatable member, divided by the factor common to both the first and the second radius. The common factor is chosen such that if both the first radius and the second radius are divided by this common factor, integer numbers result, which integer numbers are referred to as the first integer and the second integer respectively.

It is noted that the first number and the second number mentioned above both refer to the number of detectable elements mounted on the first rotatable member and the second rotatable member respectively, and therefore are also integer numbers. The two products mentioned above are therefore integer products.

The detectable elements may be magnetic elements, and may be constituted by individual magnets. Their rotation can be detected by an electromagnetic sensor. In an embodiment, the detectable elements comprise a toothed ring and an inductive probe configured for detecting the teeth of the ring.

In another embodiment, the detectable elements comprise Hall elements and a passive magnet.

In another embodiment, the detectable elements may be optical elements, that is, elements producing an optically detectable effect. Such elements can be active (light emitting) or passive (light reflecting). Suitable optical elements may be constituted by elements which alternatingly have a different reflectance, such as alternating reflecting and non-reflecting surfaces, alternating black and white surfaces, but also by active optical elements such as LEDs which may be sufficiently spaced apart to be individually detectable.

The device of the present invention may comprise a first sensor for detecting rotation of the detectable elements mounted on the first rotatable member and a second sensor for detecting rotation of the detectable elements mounted on the second rotatable member.

The second rotatable member and the second sensor may be arranged in a common housing. The first sensor may also be arranged in the common housing.

The first rotatable member and the second rotatable members are coupled to allow a rotation of the second rotatable member in response to a rotation of the first rotatable member. Several types of coupling of the rotatable members are possible. In an embodiment, the second rotatable member is magnetically coupled with the first rotatable member. In another embodiment, the second rotatable member is mechanically coupled with the first rotatable member. A mechanical coupling may involve by gear teeth. However, a belt coupling is also possible.

In a preferred embodiment, M equals 100, N equals 7, P equals 109 and Q equals 4. These numbers provide an embodiment in which the first and second rotatable members have convenient relative sizes, the ratio of their radii being 100:7, and in which up to 7 revolutions can be counted without resorting to storing the number of revolutions. It will be understood, however, that other values of M, N, P and/or Q are possible and fall within the scope of the invention.

The device defined above is configured for enabling an absolute angle measurement. The actual measurement of the rotation of the rotatable members is carried out by the above-mentioned sensors, while the calculation of the absolute angle, or of an equivalent measure, may be carried out by a processor. Advantageously, the device of the present invention may be further be provided with a processor unit configured to:
  obtain parameter values;
  calculate Bézout numbers using the parameter values;
  obtain measured angles;
  multiply each measured angle with a respective Bézout number;
  add the resulting products; and
  output the resulting sum.
The processor unit may be accommodated in a common housing together with the sensors, or may have a remote location. The processor unit comprises a processor, a memory and any associated circuitry.

The present invention also provides a method of measuring an absolute angle using a device defined above, the method comprising the steps of:
  obtaining parameter values;
  calculating Bézout numbers using the parameter values;
  obtaining measured angles;
  multiplying each measured angle with a respective Bézout number;
  adding the resulting products; and
  outputting the resulting sum.
Embodiments of the method include the further steps of:
  scaling the resulting sum; and
  outputting the scaled sum as the absolute angle.

The present invention further provides a computer program product comprising instructions for causing a processor to carry out the method defined above. The computer program product may comprise a tangible data carrier such as a DVD or a memory stick.

BRIEF DESCRIPTION OF THE SEVERAL VIEWS OF THE DRAWINGS

The present invention will further be explained with reference to embodiments illustrated in the drawings, in which.

DETAILED DESCRIPTION OF EMBODIMENTS

The present invention provides a device for measuring an absolute angle of a rotatable member, which device is capable of measuring an angle greater than 360° (that is, $2\pi$ radians) without having to store the number of revolutions. This is achieved by an inventive set of parameters of the device, in particular the radii of the rotatable members and the number of detectable elements on those rotatable members.

The invention therefore makes it possible to determine the absolute angular position of a rotor or other rotatable member within more than one revolution. In other words, given a "zero" or initial position on the rotor, the range of angle measurement is extended from [0.360] degrees to [0.360·n] degrees where n, an integer greater than 1, can be chosen substantially arbitrarily.

Figure 1:
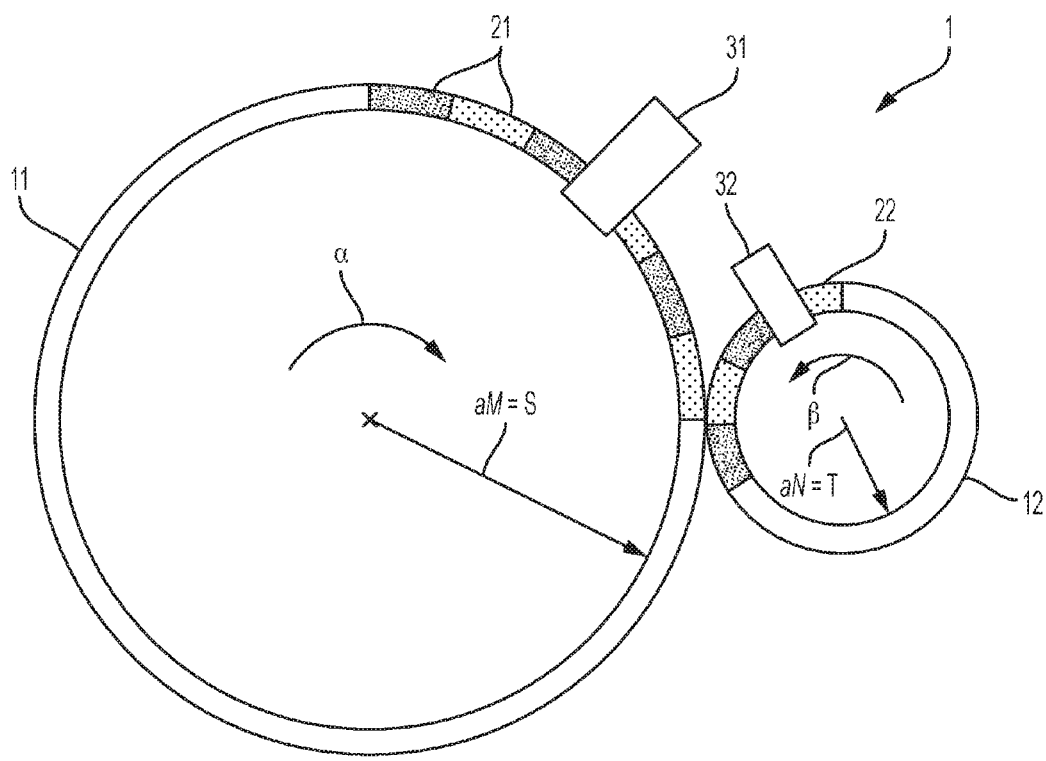
FIG. 1 schematically shows parts of a device for measuring an absolute angle according to the present invention.

The device 1 schematically illustrated in FIG. 1 is shown to comprise a first rotatable member 11, a second rotatable member 12, a first sensor 31 and a second sensor 32. The first rotatable member 11 is mounted on an axis of which the rotation angle and/or the number of revolutions is to be determined.

The rotatable members 11 and 12, which in the present embodiment may also be referred to as rotor and pinion respectively, are each provided with detectable elements 21 and 22 respectively. The detectable elements 21 and 22 may be constituted by surfaces having alternating colours, such as black and white, which make it possible to distinguish between the successive surfaces. In general, a sensor (such as sensor 31 or 32) should be able to detect the detectable elements 21 and 22 as they pass the sensor. In some embodiments, the detectable elements may be magnetic, in which case the sensors 31 and 32 will typically be electromagnetic. In the present embodiment, where optically detectable elements 21 and 22 are used, the sensors 31 and 32 will be optical sensors which may be configured to detect differences in the intensity of reflected light. The device may further comprise a light source (not shown in FIG. 1).

The rotatable members 11 and 12 are mechanically coupled in such a way that a rotation of the first rotatable member 11 causes a corresponding rotation of the second rotatable member 12. In the embodiment shown, the mechanical coupling is achieved through friction of the edge surfaces of the rotatable members 11 and 12. However, in other embodiments, gears, belts or magnetic couplings may be used instead of a friction coupling. In the following discussion it will be assumed that the angle over which the first rotatable member 11 rotates is to be determined, and that the second rotatable member 12 is an auxiliary member that facilitates determining the rotation angle of the first rotatable member.

Due to the mechanical coupling of the rotatable members, the second rotatable member 12, which may also be referred to as pinion in this embodiment, will rotate when the first rotatable member 11 rotates. The angle over which the second rotatable member 12 rotates will be determined by the ratio of the radii of the rotating members.

Let $R = a \cdot M$ and $S = a \cdot N$ denote the radii of the (main) rotor 11 and the pinion 12, respectively, where a is a positive real number and M and N are positive integer numbers. M and N could be seen as the number of gear teeth of the main rotor and the pinion, respectively, if the rotatable members were to have gear teeth, and determine the angle over which the pinion 12 rotates when the (main) rotor 11 rotates. Let P and Q be the number of detectable elements 21, 22 (which may also be referred to as encoder partitions) of the main rotor 11 and the pinion 12, respectively.

If the main rotor 11 rotates by $\alpha$ (radians), the pinion 12 rotates by $\beta = (M/N) \cdot \alpha$ (radians). Since the main rotor has P encoder partitions, when it rotates by $\alpha$, the sensor on the rotor measures an angle $\gamma = \mathrm{mod}(P \cdot \alpha, 2 \cdot \pi)$, where "mod" stands for "modulus", to produce a positive angle $\gamma$ which is smaller than $2 \cdot \pi$ radians: $0 \leq \gamma < 2 \cdot \pi$. Likewise, the sensor on the pinion measures an angle $\theta = \mathrm{mod}(Q \cdot \beta, 2 \cdot \pi)$.

We can express $\gamma$ and $\theta$ as follows:

$$P \cdot \alpha = \gamma + 2 \cdot \pi \cdot m \quad (1)$$

$$Q \cdot \beta = \theta + 2 \cdot \pi \cdot n \quad (2)$$

for some integers m and n, the exact values of which are not relevant.

Since $\beta = (M/N) \cdot \alpha$, equation (2) can be written as $$Q \cdot M \cdot \alpha = \theta \cdot N + 2 \cdot \pi \cdot n \cdot N \quad (3)$$

Multiplying both sides of (1) by $Q \cdot M$ results in $$P \cdot Q \cdot M \cdot \alpha = \gamma \cdot Q \cdot M + 2 \cdot \pi \cdot m \cdot Q \cdot M \quad (4)$$

Then multiplying both sides of (3) by P results in $$P \cdot Q \cdot M \cdot \alpha = \theta \cdot N \cdot P + 2 \cdot \pi \cdot n \cdot N \cdot P \quad (5)$$

Dividing both sides of both (4) and (5) by $2 \cdot \pi$ produces the following set of equations:

$$P \cdot Q \cdot M \cdot (\alpha / 2 \cdot \pi) = (\gamma / 2 \cdot \pi) \cdot Q \cdot M + m \cdot Q \cdot M \quad (6)$$

$$P \cdot Q \cdot M \cdot (\alpha / 2 \cdot \pi) = (\theta / 2 \cdot \pi) \cdot N \cdot P + n \cdot N \cdot P \quad (7)$$

The angles $\gamma$ and $\theta$ are measured and the angle $\alpha / (2 \cdot \pi)$ can now be calculated. Eliminating m and n in equations (6) and (7):

$$P \cdot Q \cdot M \cdot (\alpha / 2 \cdot \pi) \sim (\gamma / 2 \cdot \pi) \cdot Q \cdot M \bmod (Q \cdot M) \quad (8)$$

$$P \cdot Q \cdot M \cdot (\alpha / 2 \cdot \pi) \sim (\theta / 2 \cdot \pi) \cdot N \cdot P \bmod (N \cdot P) \quad (9)$$

Here the ~ symbol denotes an equivalence relation. Equation (8) reads $P \cdot Q \cdot M \cdot (\alpha / 2 \cdot \pi)$ is equivalent to $(\gamma / 2 \cdot \pi) \cdot Q \cdot M$ modulo $Q \cdot M$. Relation (9) reads similarly.

Relations (8) and (9) are of the form $$x \sim a1 \bmod (z1) \quad (10)$$

$$x \sim a2 \bmod (z2) \quad (11)$$

The solution to such a system of equivalence relations comes from the Chinese remainder theorem. This theorem says that $$x = D \cdot z2 \cdot a1 + C \cdot z1 \cdot a2 \quad (12)$$

satisfies (10) and (11) and is unique modulo lcm(z1, z2) (where lcm is the least common multiple). Here C and D are the so-called Bézout numbers for the pair (z1, z2), i.e. $C \cdot z1 + D \cdot z2 = \gcd(z1, z2)$ (where gcd is the greatest common divisor).

This Chinese remainder theorem is applied to relations (8) and (9). According to the present invention, the products $Q \cdot M$ and $N \cdot P$ are chosen to be co-prime. As the products $Q \cdot M$ and $N \cdot P$ are both products of integers, these products are integers too. It is noted that two integer numbers are coprime (or mutually prime) if the only positive integer that evenly divides both of them is 1. That is, the only common positive factor of the two numbers is 1. This is equivalent to their greatest common divisor being 1.

If these products $Q \cdot M$ and $N \cdot P$ are chosen to be co-prime, then $\mathrm{lcm}(Q \cdot M, N \cdot P) = Q \cdot M \cdot N \cdot P$ and $\gcd(Q \cdot M, N \cdot P) = 1$. That will then give a solution for $P \cdot Q \cdot M \cdot (\alpha / 2 \cdot \pi)$ which is unique between 0 and $Q \cdot M \cdot N \cdot P$. Since it is desired to determine the number of full revolutions, this leads to a unique solution for $\alpha / 2 \cdot \pi$ between 0 and N.

It is noted that if the products $Q \cdot M$ and $N \cdot P$ are not chosen to be co-prime, then the solution to $P \cdot Q \cdot M \cdot (\alpha / 2 \cdot \pi)$ will be unique up to $\mathrm{lcm}(Q \cdot M, N \cdot P)$, which is always less than or equal to $Q \cdot M \cdot N \cdot P$. Hence choosing $Q \cdot M$ and $N \cdot P$ to be co-prime "maximizes" the number of revolutions that can be counted and this is one of the objects of this invention.

In an example, M=100 and N=7. That means that when the main rotor makes 7 revolutions, the pinion makes 100 revolutions. Furthermore, in this example P=109 and Q=4. Therefore, when the main rotor makes one revolution the detectable elements of the rotor make 109 steps, that is, the passage of 109 detectable elements is detected. Likewise, when the pinion makes one revolution then 4 detectable elements are detected.

Accordingly, when the main rotor makes 7 revolutions, its sensor detects 7.109=763 steps or elements (angle $\gamma$). Hence, the sensor of the pinion detects 100.4=400 steps (angle $\theta$). For the sake of simplicity of the example it is assumed that initially $\gamma = \theta = 0$. As the rotor keeps rotating the next time both $\gamma$ and $\theta$ become zero simultaneously is when the rotor sensor detects 763 steps. Up until then the pair ($\gamma$, $\theta$) never assumes the same value twice. Since 763 steps detected by the rotor sensor corresponds to 7 revolutions of the rotor, it is possible to count up to 7 revolutions (N=7). Accordingly, in this example the invention allows to absolutely measure angles smaller than $14 \cdot \pi$ radians, $14 \cdot \pi$ being equal to 7 times $2 \cdot \pi$.

Figure 2:
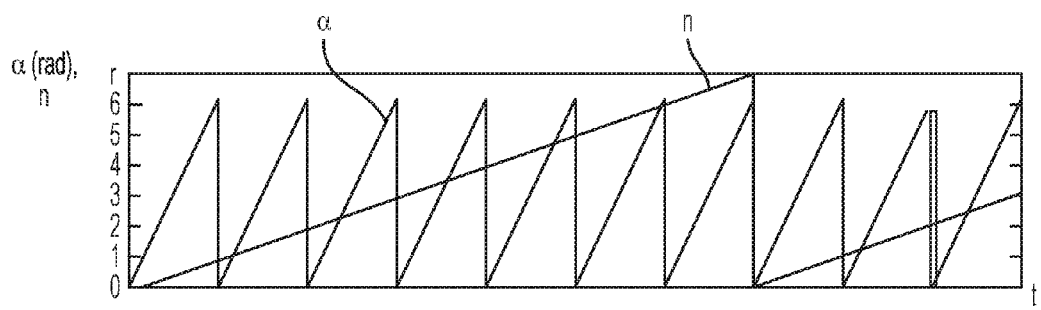
FIG. 2 schematically shows the angles α and β as determined by the embodiment of FIG. 1.

FIG. 2 shows the results of a simulation made using this example. The figure shows the number of revolutions n of the rotor, which are computed using $\gamma$ and $\theta$ only, and the mechanical angle $\alpha$ of the rotor (absolute within one mechanical revolution). The horizontal axis of FIG. 2 indicates time (t) in seconds, while the vertical axis indicates both an angle in radians (rad) and thee number of revolutions (dimensionless). It can be seen in FIG. 2 how the computed number of revolutions n matches the number of revolutions that can be obtained by simply counting the number of discontinuities ("jumps") of the rotor angle $\alpha$. However, in accordance with the invention the number of turns is obtained directly, without having to count (and therefor having to store) the number of discontinuities.

It is noted that the absolute angle is, in the present example, represented by the number of revolutions. It will be understood that this is a matter of convenient scaling and that the absolute angle is equal to the number of revolutions times $2\cdot\pi$:

$$\alpha\_abs = n \cdot 2 \cdot \pi \quad (13)$$

The main advantage of the invention is that, within a certain range, it eliminates the need to count the jumps of the rotor angle. The counting concept requires that there be a memory where the number of turns is stored and which incremented at each jump of the rotor angle. This invention does not rely on the past rotor angle to compute the number of turns. It is absolute within a certain predetermined number of revolutions (here: 7 revolutions) by construction.

Another advantage of this invention is that if the rotor rotates while any electronic parts of the device are switched off, the number of turns it made is known as soon as the electronic parts are switched on again. That is not the case for the counting concept since any jump the rotor angle makes will not be detected while the electronic parts are switched off.

Figure 3:
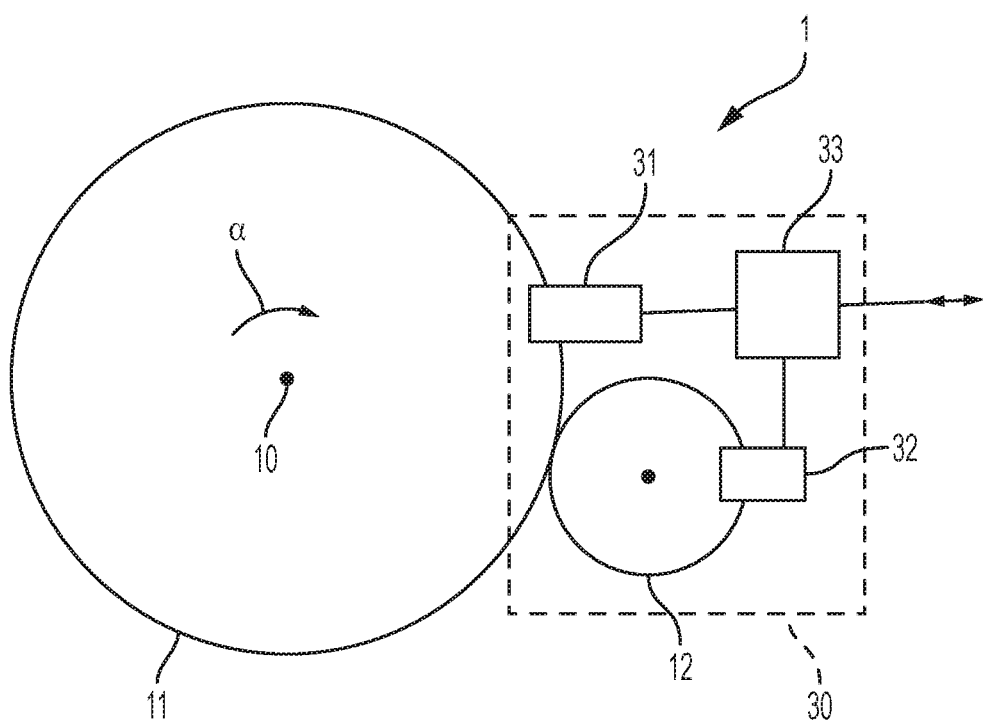
FIG. 3 schematically shows a device for measuring an absolute angle according to the present invention in more detail.

In the embodiment of FIG. 3, the device 1 includes a unit or housing 30 which accommodates the second rotatable member 12, the first sensor 31, the second sensor 32 and a processing unit 33. The processing unit 33 may include a processor and an associated memory, and may be configured for determining an angle α in accordance with the present invention. The first rotatable member 11 is shown to be mounted on an axis 10, the rotation of which is to be determined.

More in particular, the processing unit 33 is configured for counting the number of detectable elements (21 in FIG. 1) which passes the first sensor 31 in a period of time, thus producing a first number, which is indicative of the angle γ over which the first rotatable member 11 rotates. The processing unit 33 is also configured for counting the number of detectable elements (22 in FIG. 1) which passes the second sensor 32 in a period of time, thus producing a second number. This second number is indicative of the angle θ over which the second rotatable member 12 rotates.

An exemplary calculation expressed in MATLAB will now be provided. First, the parameters M, N, P, Q and R given their values:
M=100;
N=7;
R=M/N;
P=109;
Q=4;
Then, the Bézout numbers C and D are calculated using a MATLAB function gcd, which also provides the greatest common divisor G, in addition to the Bézout numbers C and D:

$$[G, C, D] = \gcd(N^*P, M^*Q)$$

G=gcd(A, B) is the greatest common divisor of A and B. The values A and B must be integer values. The function [G, C, D]=gcd(A, B) also returns C and D such that G=A·C+B·D. In the present example, A=N·P and B=M·Q, so G=N·P·C+M·Q·D.

In accordance with the present invention, the greatest common divisor G of the products N·P and M·Q equals 1. The value of G can be used to check whether the correct values of M, N, P and Q were chosen.

In the particular MATLAB example, vectors consisting of 7000 rotational positions of α and β are reserved, assuming a total number of 7 revolutions:

revs=7;
alpha=linspace(0, 2*pi*revs, revs*1000);
beta=M/N*alpha;
The measured angles are, as mentioned above:
gamma=mod(P*alpha, 2*pi);
theta=mod(Q*beta, 2*pi);
The absolute angle α_abs can now be calculated. In the present example, the absolute angle is output as the number of revolutions n:
for i=1:length(alpha)

n(i)=mod(theta(i)/2/pi*D+gamma(i)/2/pi*C, 1)*N;

end
This corresponds with equation (12) above. It can be seen that the number of revolutions n is calculated using the Bézout numbers C and D, which are multiplied with the angles γ and θ respectively. The resulting products are scaled to yield revolutions instead of an angle, but those skilled in the art will understand that these are alternative ways of expressing essentially the same variable. By determining the resulting number modulo 1, a number between 0 and 1 is obtained. Multiplying this number by N, the absolute angle α_abs is output as a number n between 0 and N (here: between 0 and 7) representing the number of revolutions of the rotor 11.

It is noted that the multiplication with the number N is carried out as in the present example, the number N is equal to the maximum number of rotations that can be determined in an absolute manner. However, in embodiments having other values of M, N, P and Q, this is not necessarily the case.

Embodiments of the method of the invention, such as the example defined above in MATLAB code, can be summarized as:
obtain the parameter values M, N, P and Q;
calculate the Bézout numbers C and D using the parameter values;
obtain the measured angles γ and θ;
multiply each measured angle γ and θ with a respective Bézout number C, D;
add the products;
scale the resulting sum; and
output the scaled sum as the absolute angle α_abs or as the number of revolutions n.

It is noted that the steps of multiplying and scaling may form a single, combined step. Part of the scaling step (in particular, dividing by $2\cdot\pi$) may be omitted when the absolute angle α_abs is output instead of the number of revolutions. The term scaling is here meant to include the modulo operation.

Figure 4:
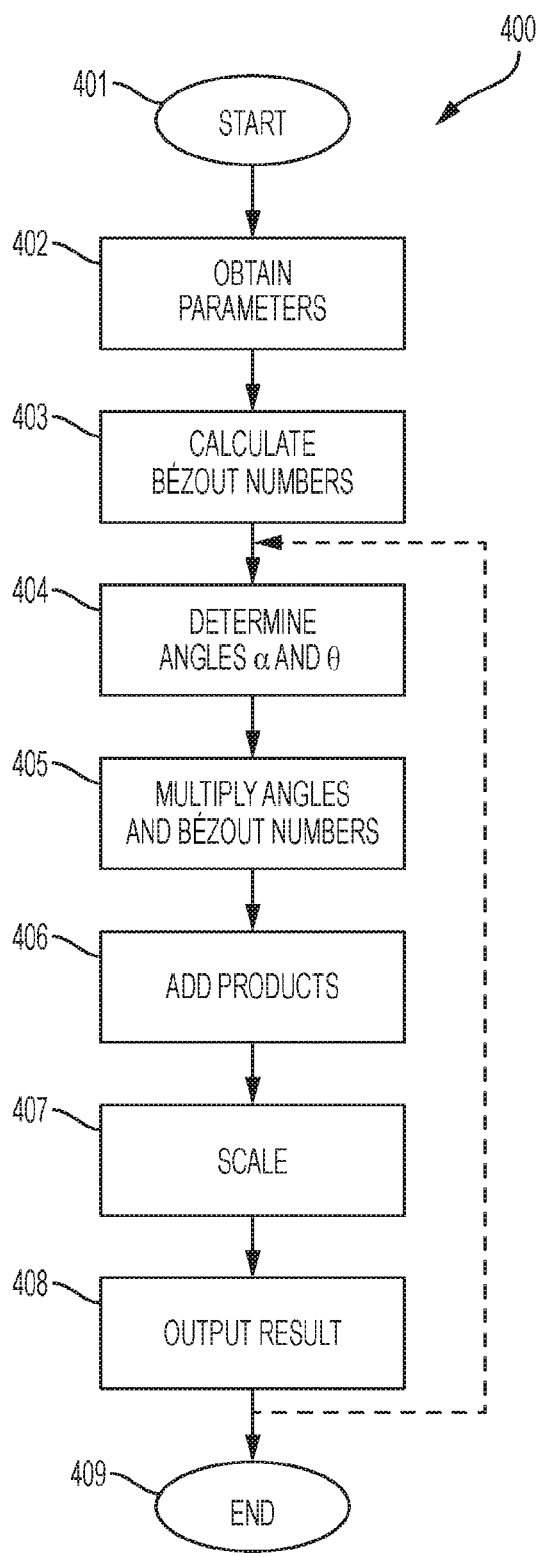
FIG. 4 is a flow chart outlining the general steps of a method according to an embodiment of the present invention.

The method is schematically illustrated in FIG. 4, where the method 400 is shown to start in step 401. In step 402, the parameter values M, N, P and Q are obtained, for example from memory or from an input unit, such as a keyboard. In step 403, the Bézout numbers, which are also known as Bézout coefficients, are calculated using an algorithm know per se, for example the extended Euclidean algorithm (see https://en.wikipedia.org/wiki/Extended Euclidean algorithm, for example). In step 404, the angles γ and θ are determined, for example by using the sensors 31 and 32.

The actual calculation takes place in step 405, where the first Bézout number C is multiplied with γ and the second Bézout number D is multiplied with θ, after which the resulting products are added in step 406. During steps 405 and/or 406, or during a subsequent step 407, the result is scaled to obtain a desired result. Scaling may involve a division by $2\cdot\pi$ to obtain a number of revolutions instead of an angle, multiplication by a factor (for example 7) indicating the maximum absolute angle or absolute number of revolutions that can be determined, and/or performing a modulus operation to provide a unique outcome.

The result is output in step 408. The method ends in step 409. Of course, the steps 404 to 408 may be repeated as many times as desired.

It is noted that instead of the values of M, N, P and Q mentioned above, other values may be used. The diameter of the first rotatable member preferably lies in a range from 20 to 300 mm, although larger diameters are possible, even as large as 2000 mm. Accordingly, the radius R (=a·M) therefore ranges from 10 to 150 mm. The number P of detectable elements on the first rotatable member may range from 10 to 160, but values over 1000 are also feasible. The value of S (=a·N) preferably lies in the range 2-10 mm, although other values are also possible. The value of Q preferably lies between 2 and 11. An example of a suitable set of values is: M=271, N=19, P=131 and Q=10. It can be seen that P·N=2489 and that Q·M=2710. Using the well-known Euclidean algorithm, it can readily be shown that the products P·N and Q·M are co-prime.

It is further noted that in some embodiments, the sensors 31 and 32 may be combined to form a single sensor unit configured for counting the detectable elements of both rotatable members 11 and 12. While in the embodiment shown the ratio of the rotational velocities of the two rotatable members is determined by their circumferences, which are mechanically coupled (for example by friction), this is not essential and embodiments can be envisaged in which the circumferences of the two rotatable members are not adjacent, the mechanical coupling being accomplished by gears. In such embodiments, the rotatable members need not lie in the same plane, as in the embodiments shown. In the preferred embodiment shown, however, the rotatable members 11 and 12 are not coaxial but are located in substantially the same plane.

A computer program product according to the invention comprises instructions allowing a processor to carry out the steps of the method defined above. The computer program product may include a tangible carrier, such as a DVD or a memory stick, but may alternatively be a remotely stored set of instructions which can be downloaded from the internet, for example.

It will be understood that the description of the invention given above is not intended to limit the invention in any way. Singular nouns and the articles "a" and "an" are of course not meant to exclude the possibility of plurals. Devices mentioned in this document may be replaced with their successors, even if these successors are not yet known at the time of writing. As is well established in the law of patents, the abstract should never be used to limit the scope of the claims, and neither should reference numbers in the claims.

It will further be understood by those skilled in the art that the present invention is not limited to the embodiments mentioned above and that many additions and modifications are possible without departing for the scope of the invention as defined in the appending claims.

The invention claimed is:

1. A device for measuring an absolute angle of an axle, the device comprising:
a first rotatable member having a first radius (S) and a first perimeter,
a second rotatable member having a second radius (T) and a second perimeter,
a first number (P) of detectable elements provided on the first rotatable member adjacent to a first perimeter thereof,
a second number (Q) of detectable elements provided on the second rotatable member adjacent to a second perimeter thereof,
a first sensor is mounted on the first rotatable member and configured for detecting rotation of the first number of detectable elements, and a second sensor is mounted on the second rotatable member and configured for detecting rotation of the second number of detectable elements,
wherein the first radius (S) is equal to a first integer (M), which is greater than zero, times a factor (a),
wherein the second radius (T) is equal to a second integer (N), which is greater than zero, times said factor (a),
wherein the first radius and the second radius are in a same units of measurement,
wherein the second rotatable member is coupled with the first rotatable member such that a rotation of the first rotatable member over a first angle ($\alpha$) causes the second rotatable member to rotate over a second angle ($\beta$) equal to the first angle ($\alpha$) times the ratio (M/N) of the first radius and the second radius, and
wherein the product of the first number (P) and the second integer (N), and the product of the second number (Q) and the first integer (M), are co-prime;
the device further comprising a processor configured to:
obtain parameter values (M, N, P, Q); calculate Bézout numbers (C, D) using the parameter values; obtain measured angles ($\gamma,\theta$); multiply each measured angle ($\gamma,\theta$) with a respective Bézout number (C, D); add resulting products; output a resulting sum; scaling the resulting sum; and outputting the scaled sum as the absolute angle of the axle.

2. The device according to claim 1, wherein the detectable elements are magnetic elements.

3. The device according to claim 1, wherein the detectable elements are optical elements.

4. The device according to claim 1, wherein the second rotatable member and the second sensor are arranged in a common housing.

5. The device according to claim 4, wherein the first sensor is arranged in the common housing.

6. The device according to claim 1, wherein the second rotatable member is magnetically coupled with the first rotatable member.

7. The device according to claim 1, wherein the second rotatable member is mechanically coupled with the first rotatable member.

8. The device according to claim 7, wherein the second rotatable member is mechanically coupled with the first rotatable member by gear teeth.

9. The device according to claim 1, wherein M equals one hundred (100), N equals seven (7), P equals one hundred nine (109) and Q equals four (4).

10. A method of measuring an absolute angle of an axle using a device, the method comprising:
providing a first rotatable member having a first radius (S) and a first perimeter,
a second rotatable member having a second radius (T) and a second perimeter,
a first number (P) of detectable elements provided on the first rotatable member adjacent to a first perimeter thereof,
a second number (Q) of detectable elements provided on the second rotatable member adjacent to a second perimeter thereof,
a first sensor is mounted on the first rotatable member and configured for detecting rotation of the first number of detectable elements, and a second sensor is mounted on the second rotatable member and configured for detecting rotation of the second number of detectable elements, wherein the first radius (S) is equal to a first integer (M), which is greater than zero, times a factor (a), wherein the second radius (T) is equal to a second integer (N), which is greater than zero, times said factor (a), wherein the first radius and the second radius are in a same units of measurement, wherein the second rotatable member is coupled with the first rotatable member such that a rotation of the first rotatable member over a first angle ($\alpha$) causes the second rotatable member to rotate over a second angle (3) equal to the first angle ($\alpha$) times the ratio (M/N) of the first radius and the second radius, and wherein the product of the first number (P) and the second integer (N), and the product of the second number (Q) and the first integer (M), are co-prime, obtaining parameter values (M, N, P, Q); calculating Bézout numbers (C, D) using the parameter values; obtaining measured angles ($\gamma,\theta$); multiplying each measured angle ($\gamma,\theta$) with a respective Bézout number (C, D); adding resulting products; outputting a resulting sum; scaling the resulting sum; and outputting the scaled sum as the absolute angle of the axle.

* * * * *